(12) United States Patent
Lo

(10) Patent No.: US 9,348,436 B2
(45) Date of Patent: May 24, 2016

(54) MOUSE HAVING AN ADJUSTABLE GRIP

(71) Applicant: Jen-Yang Lo, Taipei (TW)

(72) Inventor: Jen-Yang Lo, Taipei (TW)

(73) Assignee: EVGA CORPORATION, New Taipei (TW)

( * ) Notice: Subject to any disclaimer, the term of this patent is extended or adjusted under 35 U.S.C. 154(b) by 149 days.

(21) Appl. No.: 14/188,584

(22) Filed: Feb. 24, 2014

(65) Prior Publication Data

US 2015/0138092 A1    May 21, 2015

(30) Foreign Application Priority Data

Nov. 19, 2013   (TW) .............................. 102142016 A

(51) Int. Cl.
*G06F 3/033* (2013.01)
*G06F 3/0354* (2013.01)
(52) U.S. Cl.
CPC .... *G06F 3/03543* (2013.01); *G06F 2203/0332* (2013.01)
(58) Field of Classification Search
CPC .... G06F 3/03543; G06F 2203/033–2203/0384
See application file for complete search history.

(56) References Cited

U.S. PATENT DOCUMENTS

| 2006/0007145 A1* | 1/2006 | Naghi | G06F 3/03543 345/163 |
| 2007/0132732 A1* | 6/2007 | Chen  | G06F 3/03543 345/163 |
| 2008/0055250 A1* | 3/2008 | Chang | G06F 3/03543 345/163 |

FOREIGN PATENT DOCUMENTS

| TW | I322955 | 4/2010 |
| TW | I331297 | 10/2010 |
| TW | I386584 | 2/2013 |

* cited by examiner

*Primary Examiner* — Matthew Sim
(74) *Attorney, Agent, or Firm* — Che-Yang Chen; Law Offices of Scott Warmuth

(57) ABSTRACT

This invention discloses a mouse having an adjustable grip, including a mouse base; a first grip housing installed in the mouse base and a front end of the first grip housing pivotally connected with a front end of the mouse base; a second grip housing installed on the mouse base and rear of the first grip housing; an adjustable grip mechanism installed on the mouse base and having an actuator assembly, a first linkage assembly, and a second linkage assembly. The actuator assembly is pivotally connected with the first linkage assembly and the second linkage assembly, respectively. A user is able to operate the actuator assembly to generate force to drive the first linkage assembly and the second linkage assembly, so as to adjust both positions of the first grip housing and the second grip housing simultaneously and meet different user's grip habits.

7 Claims, 6 Drawing Sheets

MOUSE HAVING AN ADJUSTABLE GRIP

CROSS-REFERENCE TO RELATED APPLICATION

This application claims the benefit of Taiwan Application No. 102142016, filed on Nov. 19, 2013, in the Taiwan Intellectual Property Office, the disclosure of which is incorporated herein its entirety by reference.

BACKGROUND OF THE INVENTION

1. Field of the Invention

The present invention generally relates to a mouse having an adjustable grip, particularly, to an adjustable mechanism which can be adjusted at user's will and applied to mouse product to meet different user's grip habits.

2. Description of the Related Art

Mouse has been widely used to control the computer cursor, so far, however, most of the existing mice lack the function of adjusting the grip angle, and the top surface thereof are fixed, which disobeys ergonomic in design. Because the palms of each person are different in shape and size, while operating a mouse, the user has to condescend to the grip angle of the top surface of a mouse, as a result, fatigue of hands, damage to wrist along with joints of the fingertips, and so on, are inevitable after a long period of operation.

Although the published Taiwan Patents of No. I322955, I386584, and I331297 have tried to provide solutions of adjusting grip angle, the common ground thereof is to reduce effect of the carpal tunnel syndrome and relieve the pressure applied on user's wrist by modifying the grip structure of a mouse to have an inclined angle.

Moreover, the structure designers of the current mice do not take the submissiveness between palm and grip of a mouse into consideration, so that it is not easy for such mouse to fit the palm of different user, in particular for those groups who need to use mouse with specific design.

According to the afore-mentioned descriptions, the present invention provides a mouse having an adjustable grip and improves the structure of adjustable grip mechanism, so as to solve the existing defect and thereby promote the industrial applicability.

SUMMARY OF THE INVENTION

In view of the afore-mentioned problem, one of the purposes of the present invention is to provide a mouse having an adjustable grip and the structure of the adjustable grip can be adjusted upon users' demand to meet different grip habits.

In accordance with the above purpose, the present invention is to provide a mouse having an adjustable grip, which can be adjusted in accordance with user's grip habits. The mouse having an adjustable grip comprises a mouse base, a first grip housing, a second grip housing and an adjustable grip mechanism. The first grip housing is installed in a mouse base and the front end of the first grip housing is pivotally connected with the front end of the mouse base. The second grip housing is installed on the mouse base and the rear of the first grip housing. The adjustable grip mechanism is installed on the mouse base and has an actuator assembly, a first linkage assembly, and a second linkage assembly. The actuator assembly is pivotally connected with the first linkage assembly and the second linkage assembly, respectively. The actuator assembly can be operated to generate force to drive the first linkage assembly and the second linkage assembly, so as to adjust position of the first grip housing and the second grip housing simultaneously.

Preferably, the actuator assembly comprises: a fixed base; a guide rail installed on the fixed base; a link plate installed on the guide rail; a force generator installed on the mouse base and connected with the link plate. The first linkage assembly comprises a lifting linkage installed in the inner side of the first grip housing; a first linkage pivotally connecting with the link plate and the lifting linkage, respectively. The second linkage assembly comprises a lifting block installed in the inner side of the second grip housing. The second linkage is pivotally connected with the link plate and the lifting block, respectively. By the movement of the actuator assembly, the first linkage assembly is driven to lift the first grip housing and the second linkage assembly is driven simultaneously to lift the second grip housing.

Preferably, the force generator is connected with the link plate to drive movement of the link plate, and the force generator may comprise an adjustable bolt set, a spring clamping mechanism, or a spring pressing mechanism.

Preferably, the force generator further comprises a stopper for limiting the displacement of the link plate, and the stopper comprises a C-type circlip, an E-type circlip, a pin nut, or a stop nut.

Preferably, when the adjustable bolt set is used as the force generator, the adjustable bolt set further comprises a motor cooperating with the adjustable bolt set for adjusting grip position automatically.

Preferably, when the spring pressing mechanism is used as the force generator, the spring pressing mechanism can segmentally drive movement of the link plate.

Preferably, the outer surface of the second grip housing comprises an elastic body for bearing weight of palm, and the material of the elastic body comprises rubber, silica gel, or thermoplastic elastomer.

Preferably, the position adjustment of the first grip housing or the second grip housing comprises swinging or vertical elevation.

Preferably, a position limiting structure for limiting the movement of the first grip housing or the second grip housing is further installed in the mouse base.

Preferably, the mouse further comprises a counterweight member which is installed under the first grip housing.

The main purpose of the present invention is to provide a mouse having an adjustable grip, and such mouse has numerous advantages as follows while maintaining its original functions:

1. Better handling: it takes only simple steps to adjust the grip angle and the height simultaneously according to the movement of linkage mechanisms, so that the user's palm can fit in with the curved arc surface of the grip housing.

2. Adaptive adjustment: different user's grip habits can be met by adjusted the adjustable mechanism, so as to achieve the purpose of adjusting adjustment.

3. Ergonomics design: the anthropometry data has been introduced to match the ergonomics.

The above and other features and advantages of the example embodiments will become more apparent by describing in detail preferred embodiments thereof with reference to the attached drawings.

DETAILED DESCRIPTION OF THE PREFERRED EMBODIMENTS

Figure 1:
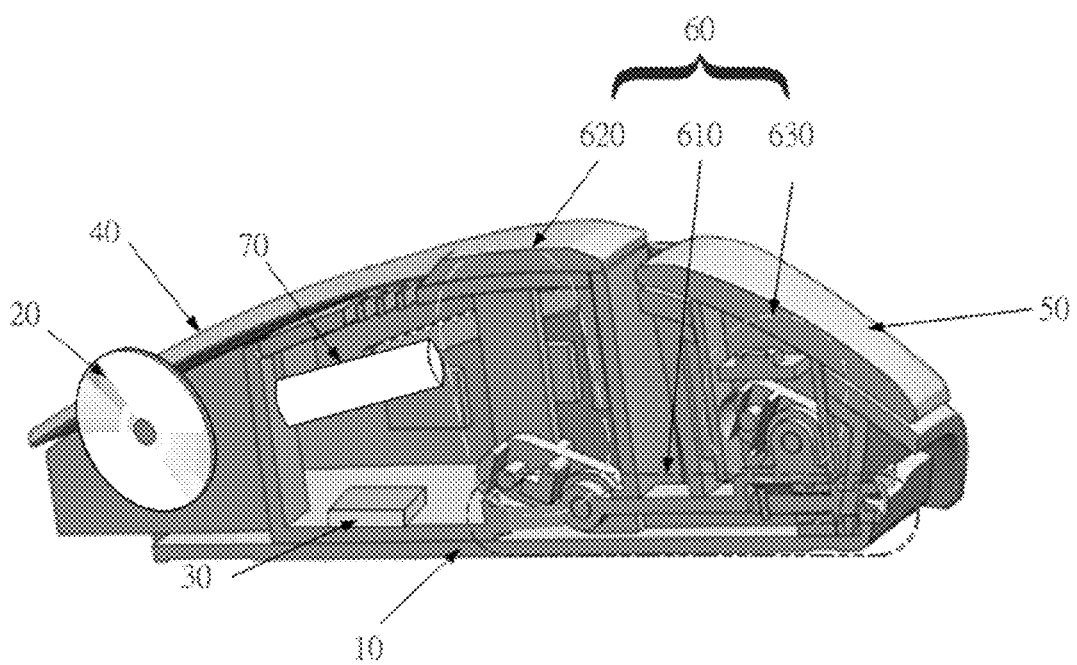
FIG. 1 is a structural schematic view of a mouse having an adjustable grip of the present invention.

Hereinafter, embodiments of the present invention will be described in details with reference to the accompanying drawings so that those skilled in the art to which the present invention pertains can realize the present invention. Those skilled in the art will understand that since elements shown in the accompanying drawings may be scaled up or down for convenience in description, the present invention is not constrained to the size or shape of the elements illustrated in the drawings, rather various variations and other equivalent embodiments are also contemplated.

The above and other features and advantages of the present invention will become more apparent by describing in detail preferred embodiments thereof with reference to the attached drawings. The present invention may be embodied in many different forms and should not be construed as limited to the exemplary embodiments set forth herein. These embodiments are provided so that this disclosure will be thorough and complete, and will fully convey the scope of the invention to those skilled in the art. The terminology used herein is for the purpose of describing particular embodiments only and is not intended to be limiting of the invention. Therefore, the true technical protection scope of the present invention will be defined by the technical spirit of the accompanying claims and their equivalents.

Figure 2:
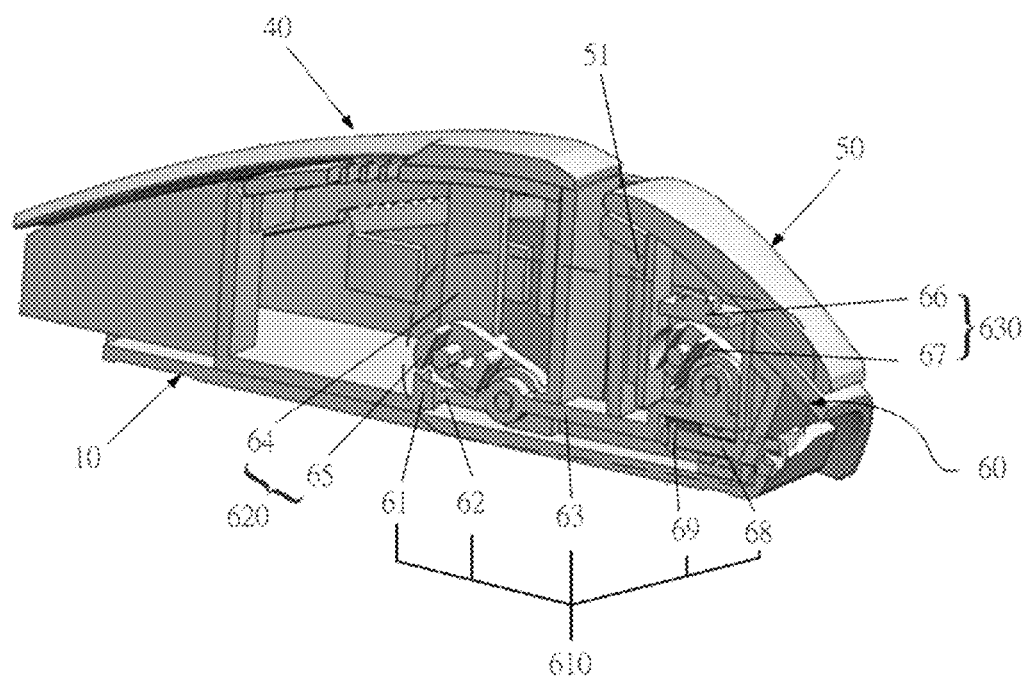
FIG. 2 is a detailed structural schematic view of a mouse having an adjustable grip of the present invention.

With reference to both FIG. 1 and FIG. 2, FIG. 1 is a structural schematic view of a mouse having an adjustable grip of the present invention, and FIG. 2 is a detailed structural schematic view of a mouse having an adjustable grip of the present invention. As shown in FIG. 1, a mouse A which has an adjustable grip may comprise a mouse base 10, a roller module 20, a control unit 30, a first grip housing 40, a second grip housing 50, and an adjustable grip mechanism 60. The mouse base 10 may be structural substrate of the mouse A, the roller module 20 is used to control the cursor location of the mouse A, and the control unit 30 installed on the mouse base 10 is used to detect the cursor location of the mouse A and input instructions. The first grip housing 40 is a housing structure installed the mouse base 10 and the front end of the first grip housing 40 is pivotally connected with the front end of the mouse base 10. The second grip housing 50 is a housing structure installed on the mouse base 10. The adjustable grip mechanism 60 is installed on the mouse base 10 and includes an actuator assembly 610, a first linkage assembly 620, and a second linkage assembly 630. The actuator assembly 610 is pivotally connected with the first linkage assembly 620 and the second linkage assembly 630, respectively.

A grip angle can be adjusted by the movement of the adjustable grip mechanism 60 according to user's 80 grip habits, so that a palm of user 80 is able to fit in with the curved surface formed by the first grip housing 40 and the second grip housing 50. A counterweight member 70 can be installed within the space formed by the first grip housing 40 and the mouse base 10 of the mouse A so as to satisfy the handling comfort of the user 80.

Moreover, as shown in FIG. 2, the adjustable grip mechanism 60 comprises the actuator assembly 610, the first linkage assembly 620, and the second linkage assembly 630. The actuator assembly 610 comprises a fixed base 61, a guide rail 62, a link plate 63, and a force generator 68. The first linkage assembly 620 comprises a lifting linkage 64 and a first linkage 65. The second linkage assembly 630 comprises a lifting block 66 and a second linkage 67.

The fixed base 61 is installed on the mouse base 10 to fix the guide rail 62, and the link plate 63 is installed on the guide rail 62 for limiting the link plate 63 to move horizontally along the guide rail 62, and the lifting linkage 64 is installed in the inner side of the first grip housing 40. The first linkage 65 is pivotally connected with the link plate 63 and the lifting linkage 64, respectively. The lifting block 66 is installed in the inner side of the second grip housing 50, and the second linkage 67 is pivotally connected with the link plate 63 and the lifting block 66, respectively. The force generator 68 is installed on the mouse base 10 and connected with the link plate 63.

Furthermore, the link plate 63 is driven to move horizontally alongside the guide rail 62 by the movement of the force generator 68. While the link plate 63 is moving, the lifting linkage 64 is driven by the first linkage 65 to lift the first grip housing 40; meanwhile, the second linkage 67 also drives the lifting block 66 to lift the second grip housing 50. The force generator 68 further comprises a stopper 69 for limiting the movement of the link plate 63, and the stopper 69 may comprise, but not limited to, a C-type circlip, a E-type circlip, a pin nut, or a stop nut. The movement of the first grip housing 40 comprises swinging or vertical elevation, and the movement of the second grip housing 50 comprises swinging or a vertical elevation. The force generator 68 may comprise an adjustable bolt set 681, a spring clamping mechanism 682, or a spring pressing mechanism 683.

In addition, a position limiting structure 51 for limiting the movement range of the second grip housing 50 is further installed in the mouse base 10, and the first grip housing 40 may also comprise several ventilation holes for heat dissipation, and the adjustable grip mechanism 60 may comprise a motor (not shown in FIG. 1 or FIG. 2) to adjust the grip position automatically.

Figure 3:
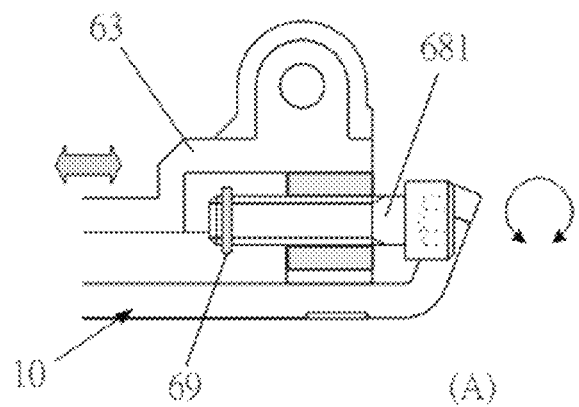
FIG. 3 is a structural schematic view of a force generator of a mouse having an adjustable grip of the present invention.
Figure 3:
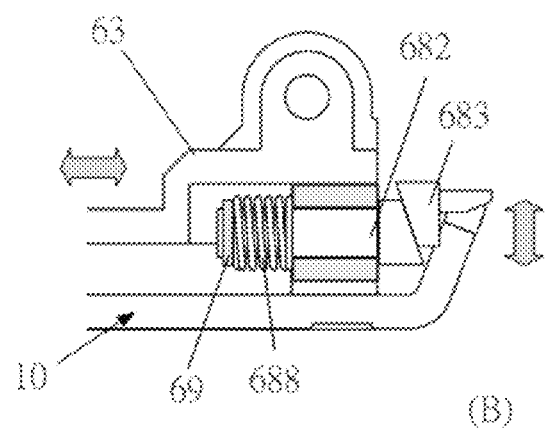
Figure 3:
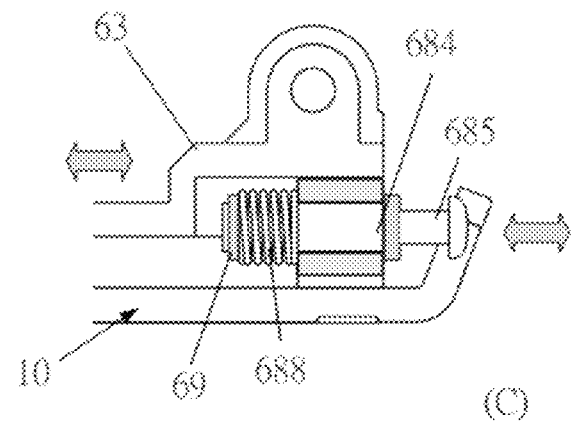

With reference to FIG. 3 for a structural schematic view of a force generator of a mouse having an adjustable grip of the present invention. According to the above description, the present invention is to adjust the grip position by the horizontal movement conducted by the link plate 63 of the adjustable grip mechanism 60, but the mechanisms capable of being used to drive the link plate 63 to perform horizontal movement are numerous, the present invention only includes a few types for exemplary embodiments as follows, but shall not be subject to this restriction.

The first type of movement is transformation from rotational movement into rectilinear movement. As shown in (A) part of FIG. 3, when the adjustable bolt set 681 is used as for the driving element of the force generator 68, the link plate 63 is driven to move rectilinearly by rotation of the adjustable bolt set 681. The adjustable bolt set 681 is the adjustable bolts and nuts cooperated with each other, and the internal bore of the adjustable bolt can be a Slot bore, a Phillips bore, a Hex bore, a 6-Lobe Drive, or a Radial bore.

The second type of movement is a transformation from up-and-down movement into left-and-right linear movement. When the spring clamping mechanism 682 is used as driving element of the force generator 68, the spring clamping mechanism 682 comprises a wedge axis 6821, a wedge pushrod 6822, and a spring 688. The wedge axis 6821 is connected with the link plate 63. The wedge axis 6821 has a wedge inclined surface corresponding to the wedge pushrod 6822. As shown in (B) part of FIG. 3, when the user 80 adjusts the wedge pushrod 6822 up-and-down, the wedge axis 6821 is driven to move and further drive the link plate 63 to move linearly in left-and-right, while the reciprocating linear motion can be conducted through the spring 688. Furthermore, the adjustable range can be set by the clamping mechanism.

The third type of movement is transformation from left-and-right movement into left-and-right linear movement. The spring pressing mechanism 683 can be used as the driving element of the force generator 68, and the spring pressing mechanism 683 comprises a pressing axis 6831, a pressing button 6832, and the spring 688. The pressing axis 6831 is connected with the link plate 63. As shown in (C) part of FIG. 3, when the user 80 desires to adjust the grip angle of a mouse, the user 80 can press the pressing button 6832 to drive the pressing axis 6831 to move, so that the link plate 63 is driven to move linearly in left-and-right, while the reciprocating linear movement is conducted through the spring 688. Furthermore, the adjustable range can be fixed by the clamping mechanism.

Figure 4:
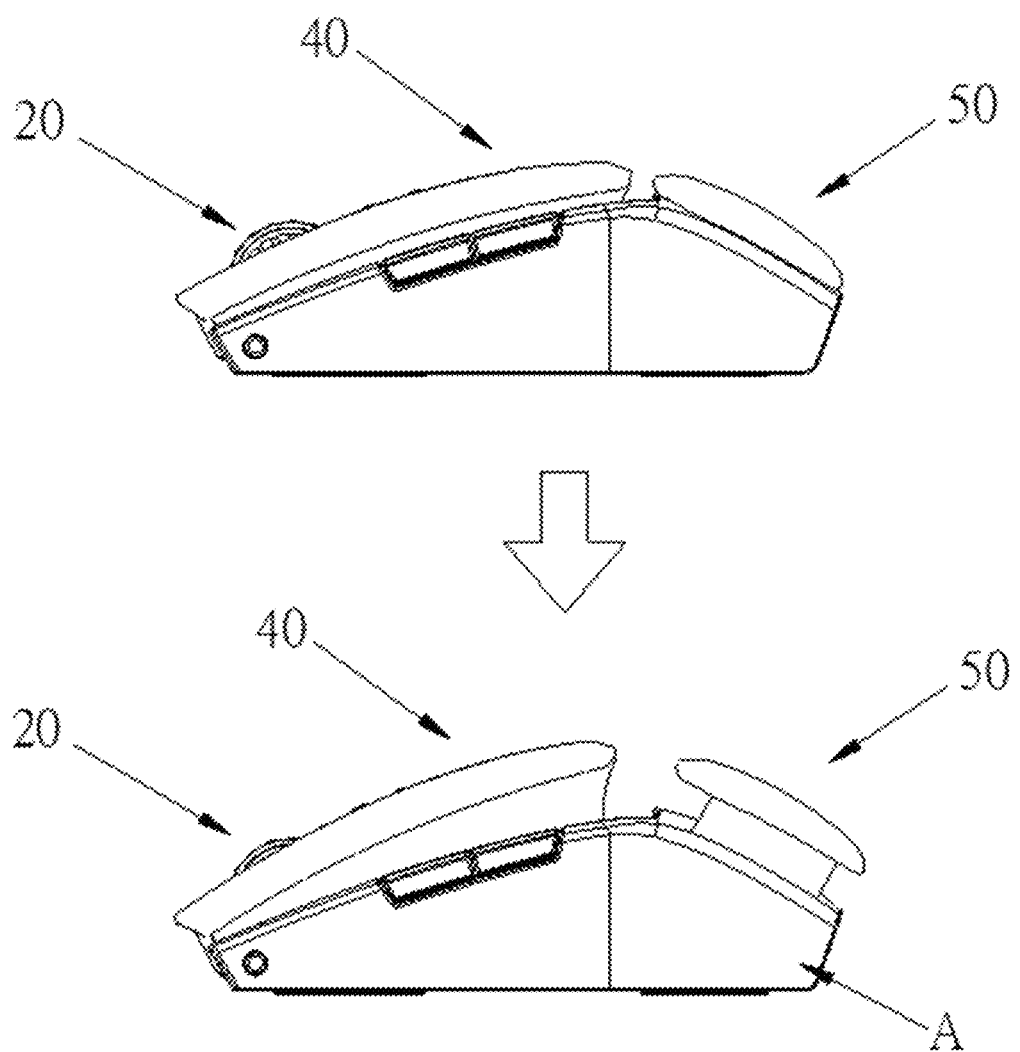
FIG. 4 is an operational schematic view of a mouse having an adjustable grip of the present invention.

With reference to FIG. 4 for an operational schematic view of a mouse having an adjustable grip of the present invention. As shown in FIG. 4, the first grip housing 40 and the second grip housing 50 form a curved arc of the mouse A. The first grip housing 40 is mainly used to bear weight of the fingertips of the user 80, and the second grip housing 50 is used to bear weight of the palm. Moreover, the second grip housing 50 may comprise an elastic body capable of assisting to bear the weight of the palm of the user 80. The elastic body may comprise rubber, silica gel, or thermoplastic elastomer. When the user 80 operates the adjustable grip mechanism 60 to make the simultaneously lifting movement of the first grip housing 40 and the second grip housing 50, the grip angle and the height can be adjusted and the palm of the user 80 can thereby fit in with the arc of the first grip housing 40 and the second grip housing 50.

Figure 5:
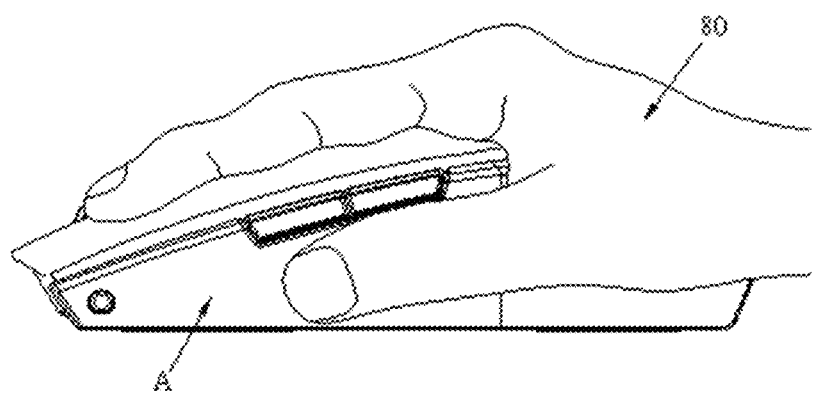
FIG. 5 is a first embodiment of a mouse having an adjustable grip of the present invention.

With reference to FIG. 5 for a first embodiment of a mouse having an adjustable grip of the present invention. The ergonomics design has been introduced into the mouse A of the present invention, and the relevant size is designed in accordance with the anthropometry database, so when the size of the user's palm falls into the scope of a standard size, an arc of the user's palm can fully fit in with surfaces of the first grip housing 40 and the second grip housing 50 of the mouse A, as shown in FIG. 5. The curved surfaces of the first grip housing 40 and the second grip housing 50 may be beautified by a surface treatment process, and the surface treatment process may comprise processes of attaching decoration, polishing, sanding, or electroplating, and so on.

Figure 6:
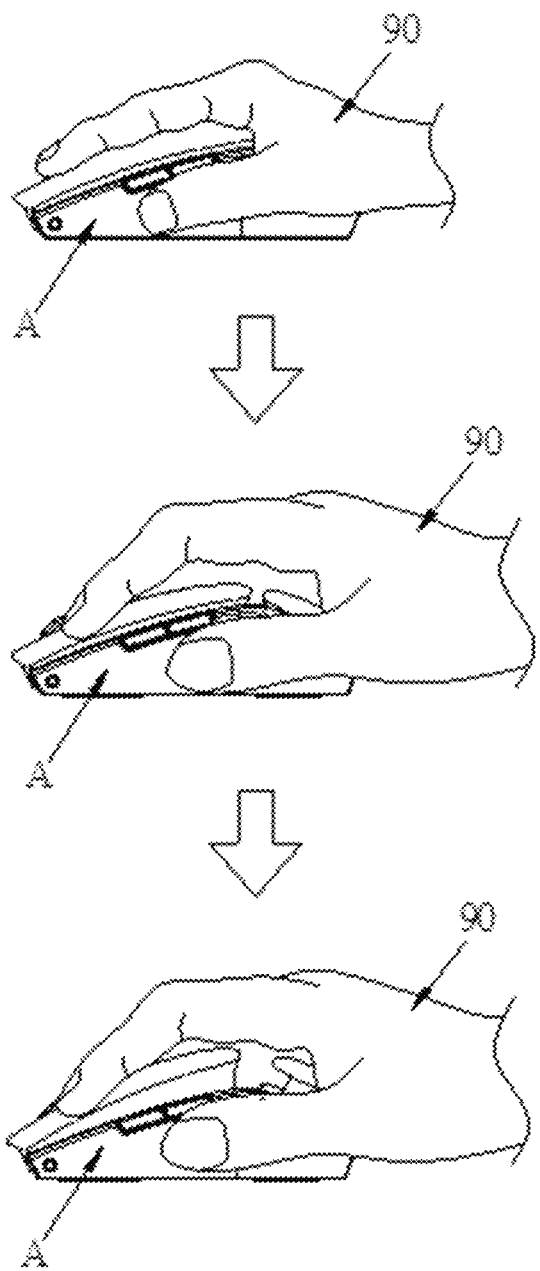
FIG. 6 is a second embodiment of a mouse having an adjustable grip of the present invention.

With reference to FIG. 6 for a second embodiment of a mouse having an adjustable grip of the present invention. As shown in FIG. 6, when palm of the user 90 is oversized, it will cause improper usages that the fingertips overstep the range of a button zone of the mouse, or the user 90 has to bend his/her fingers to operate such smaller mouse, so that the damage in the joint due to the improper usages for a long period is inevitable. As a result, the present invention provides the mouse A having the adjustable grip, which not only aims at different groups of users, but also meets their different grip habits. In addition, as shown in FIG. 6, the user 90 whose palm is oversized can adjust the grip angle and the height of the first grip housing 40 and the second grip housing 50 by the adjustable grip mechanism 60 of the mouse A of the present invention, so that the oversized palm of the user 90 can also fit in with the curved arc of the mouse fully and comfortably.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A mouse having an adjustable grip, comprising:
    a mouse base;
    a first grip housing installed in the mouse base and front end of the first grip housing pivotally connected with front end of the mouse base;
    a second grip housing installed on the mouse base and in rear of the first grip housing; and
    an adjustable grip mechanism installed on the mouse base and having an actuator assembly, a first linkage assembly and a second linkage assembly, wherein the actuator assembly is pivotally connected with the first linkage assembly and the second linkage assembly, respectively, and user is able to operate the actuator assembly to generate force to drive the first linkage assembly and the second linkage assembly, so as to synchronize position adjustment of the first grip housing and the second grip housing;
    wherein the actuator assembly comprises: a fixed base; a guide rail installed on the fixed base; a link plate installed on the guide rail and a force generator installed on the mouse base and connected with the link plate; the first linkage assembly comprises: a lifting linkage installed in inner side of the first grip housing; a first linkage pivotally connecting with the link plate and the lifting linkage, respectively; and the second linkage assembly comprises: a lifting block installed in inner side of the second grip housing; a second linkage pivotally connected with the link plate and the lifting block, respectively; wherein the movement of the actuator assembly drives the first linkage assembly to lift the first grip housing and simultaneously drives the second linkage assembly to lift the second grip housing;
    wherein the force generator is connected with the link plate to drive the link plate to move, and the force generator comprises an adjustable bolt set, a spring clamping mechanism or a spring pressing mechanism;
    wherein when the force generator is the adjustable bolt set, it further comprises a motor coordinating with the adjustable bolt set for adjusting grip position automatically.

2. The mouse of claim 1, wherein the force generator further comprises a stopper for limiting displacement of the link plate, and the stopper comprises C-type circlip, E-type circlip, pin nut or stop nut.

3. The mouse of claim 1, wherein when the force generator is the spring pressing mechanism, it can segmentally drive the link plate to move.

4. The mouse of claim 1, wherein outer surface of the second grip housing comprises an elastic body for bearing weight of palm, and the elastic body comprises rubber, silica gel or thermoplastic elastomer.

5. The mouse of claim 1, wherein position adjustment of the first grip housing or the second grip housing comprises swinging movement or vertical translation movement.

6. The mouse of claim 1, wherein a position limiting structure for limiting movement of the first grip housing or the second grip housing is further installed in the mouse base.

7. The mouse of claim 1, wherein the first grip housing further comprises a counterweight member and the counterweight member is installed under the first grip housing.

* * * * *